United States Patent [19]

Ozawa

[11] Patent Number: 5,199,107
[45] Date of Patent: Mar. 30, 1993

[54] CONTROLLER FOR EFFECTING A SERIAL DATA COMMUNICATION AND SYSTEM INCLUDING THE SAME

[75] Inventor: Yukihiro Ozawa, Kawasaki, Japan
[73] Assignee: Fujitsu Limited, Kanagawa, Japan
[21] Appl. No.: 583,280
[22] Filed: Sep. 17, 1990
[30] Foreign Application Priority Data
Sep. 19, 1989 [JP] Japan .................. 1-242675
[51] Int. Cl.$^5$ ............................. G06F 13/42
[52] U.S. Cl. ...................... 395/325; 364/DIG. 1; 364/222.2; 364/238.3; 364/239.2; 364/238.7
[58] Field of Search ............... 364/DIG. 1, DIG. 2; 395/250, 275, 325

[56] References Cited

U.S. PATENT DOCUMENTS

| | | | |
|---|---|---|---|
| 4,047,159 | 9/1977 | Boudry | 364/DIG. 1 |
| 4,298,928 | 11/1981 | Etoh et al. | 364/DIG. 1 |
| 4,388,683 | 6/1983 | Beifuss et al. | 364/DIG. 1 |
| 4,405,979 | 9/1983 | Holtey et al. | 364/DIG. 1 |
| 4,408,272 | 10/1983 | Walters | 364/DIG. 1 |
| 4,516,201 | 5/1985 | Warren et al. | 364/DIG. 1 |

Primary Examiner—Thomas M. Heckler
Attorney, Agent, or Firm—Nikaido, Marmelstein, Murray & Oram

[57] ABSTRACT

A controller for effecting a serial data communication and a system including the controller in a transmitting side and/or a receiving side thereof. The controller includes a unit for serially storing data, a unit for arbitrarily setting a bit length of data to be an object of the serial data communication, a unit for controlling a first clock to synchronize with the serial data in a serial data communication duration, and controlling a second clock to synchronize with the serial data in a duration, and a unit for indicating a permission or inhibition of the serial data communication according to whether the counted value of the first clock is within or out of a value defined by the arbitrarily set bit length. By taking data of the arbitrarily set bit length out of the serial data stored in the memory unit when the serial data communication duration is indicated, to effect the serial data communication, and inhibiting the serial data communication when the duration is indicated, it is possible to effect a serial data communication of arbitrary bit length and thus reduce the communication time.

27 Claims, 18 Drawing Sheets

Fig.2a
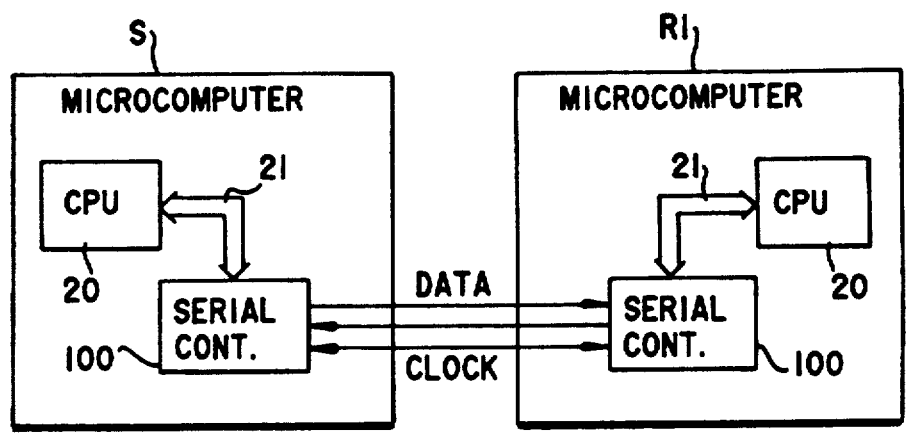
Fig.2b
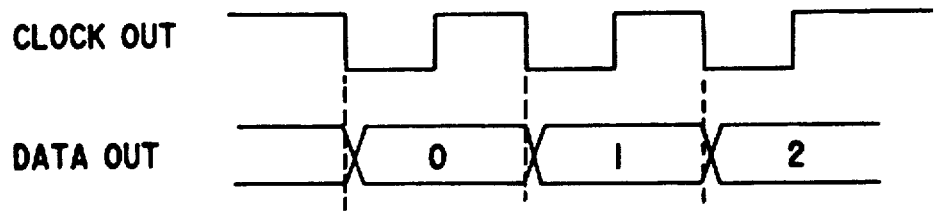
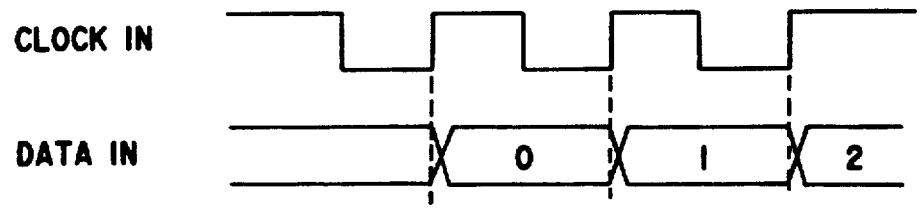
Fig.2c

Fig.4a
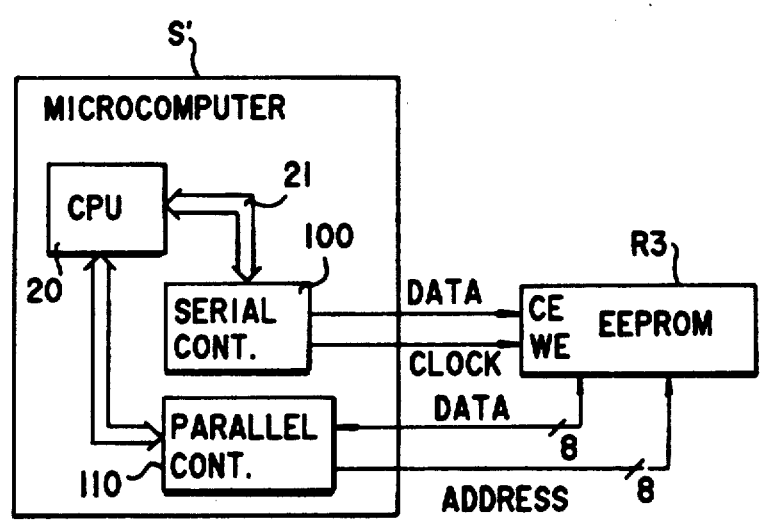
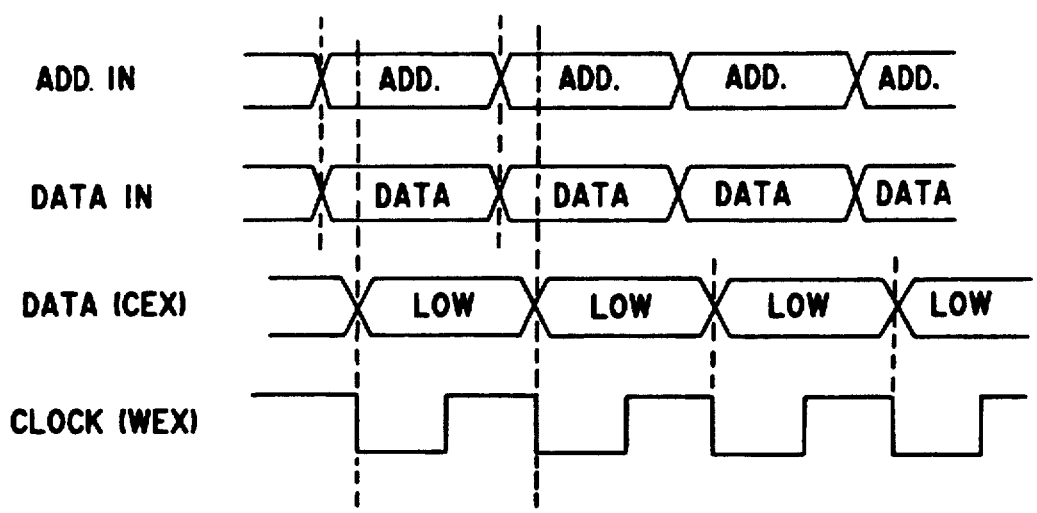
Fig.4b

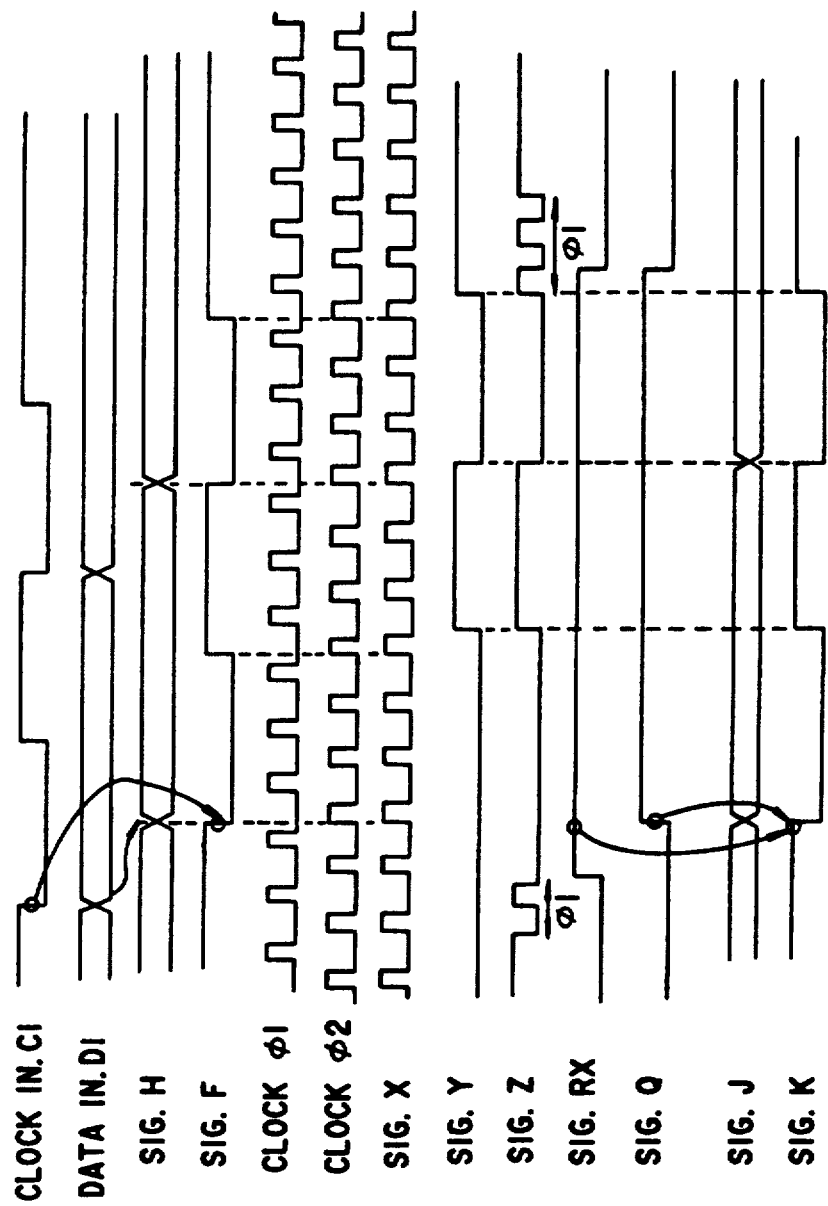

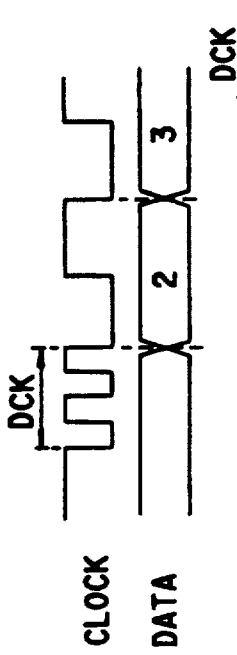
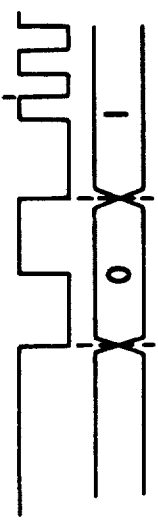
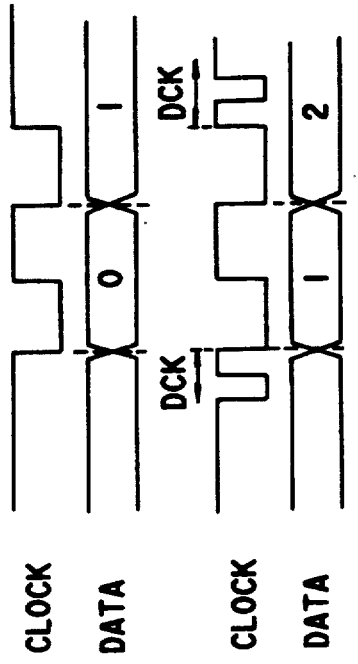
Fig.15d
Fig.15e
Fig.15f
Fig.15g
Fig.15h
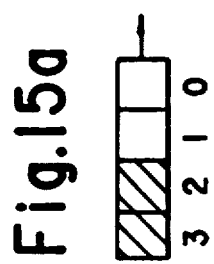
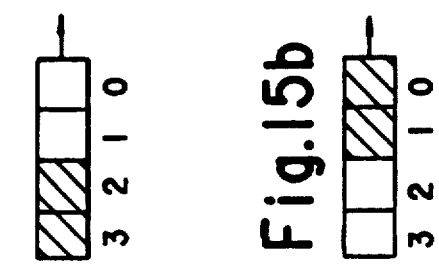
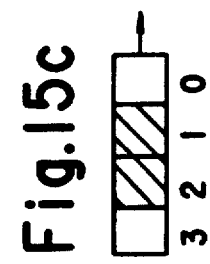
Fig.15a
Fig.15b
Fig.15c

CONTROLLER FOR EFFECTING A SERIAL DATA COMMUNICATION AND SYSTEM INCLUDING THE SAME

BACKGROUND OF THE INVENTION

1. Field of the Invention

The present invention relates to a technique of effecting a communication of a serial data, hereinafter referred to as a serial data communication. More particularly, it relates to a controller for transmitting or receiving a serial data of arbitrary bit length and a serial data communication system including the controller.

2. Description of the Related Art

In recent years, a serial data communication has been demanded to realize a communication of a serial data having an arbitrary bit length as well as that of a serial data having a fixed bit length. A typical serial data communication is carried out in a system including at least two controllers such as computers connected via a communication line to each other, and carried out by transmitting a parallel data sequentially one bit by bit and receiving the data sequentially transmitted. Computers effect data processing in the form of a parallel data and thus, for example, micro computers must translate a parallel data of 8 bits or 16 bits into a serial data in the outputting of data to the communication line and translate the serial data into the parallel data in the inputting of data from the communication line. The translation is carried out based on a program or, generally, by means of a serial transfer IC for exclusive use. In this case, the input/output of the serial data requires longer time than that of the parallel data. However, if only at least one signal line and a grounded line are provided between the micro computer and external equipment, the serial data communication is possible and thus suitably applied in the case that communication distance is long, or the case that less quantity of information is transmitted.

In view of the above background, there has been proposed a technique capable of switching a bit length of a serial data to effect the serial data communication. In such a serial data communication, the switching of the bit length is carried out by switching a plurality of fixed bit lengths, e.g., 8 bits and 16 bits. Namely, in the prior art, the bit length of data to be transmitted is switched by selecting an optimum one from among several fixed bit lengths.

In the prior art, however, it is impossible to arbitrarily set the bit length and thus a drawback occurs in that the serial data includes unnecessary information together with necessary information and it takes long time to effect the serial data communication. For example, where data to be transmitted is of 6 bits, data corresponding to 2 bits is unnecessarily transmitted when the bit length is switched to 8 bits. Thus, the serial data communication requires extra time.

Also, where a communication of a serial data of 4 bits is carried out in a serial data communication system set to 8-bit length, there arises another problem. Namely, when the transmitting side of the system transmits 4 bits serially from the LSB (least significant bit) side, the receiving side thereof receives 4 bits serially in the MSB (most significant bit) side. Thus, the arrangement of data, i.e., the location of 4-bit data in the 8-bit length, is different between the transmitting side and the receiving side. To adjust the difference of the location of 4-bit data, processing based on software is required and thus a burden to the system is increased.

SUMMARY OF THE INVENTION

An object of the present invention is to provide a controller capable of transmitting or receiving a serial data of arbitrary bit length and thus reducing time required for the serial data communication.

Another object of the present invention is to provide a system including the above controller, which can lighten processing based on software and thus decrease a burden thereto.

According to one aspect of the present invention, there is provided a controller provided in a receiving side of a serial data communication system and receiving a serial data from a transmitting side thereof, the controller including: a memory unit connected to an internal bus, for serially storing data of a predetermined bit length which is an object of the serial data communication; a bit length setting unit for arbitrarily setting a bit length of data to be really received, among the serial data in the memory unit; a synchronization unit, operatively connected to the memory unit and responsive to a serial data from the transmitting side, a first clock and a second clock, for controlling the first clock to synchronize with the serial data when the serial data communication is carried out, and controlling the second clock to synchronize with the serial data when the serial data communication is not carried out; and a communication control unit, operatively connected to the synchronization unit, for counting the first clock, when the counted value is within a value defined by the arbitrarily set bit length, indicating a first duration in which the controller is permitted to effect the serial data communication, and when the counted value is out of the value defined by the bit length, indicating a second duration in which the controller is inhibited to effect the serial data communication, whereby, when the first duration is indicated, data of the arbitrarily set bit length is taken out of the serial data stored in the memory unit and received in the internal bus, and when the second duration is indicated, the receiving of the serial data is inhibited.

Also, according to another aspect of the present invention, there is provided a controller provided in a transmitting side of a serial data communication system and transmitting a serial data to a receiving side thereof, the controller including: a memory unit connected to an internal bus, for serially storing data of a predetermined bit length which is an object of the serial data communication; a bit length setting unit for arbitrarily setting a bit length of data to be really transmitted, among the serial data in the memory unit; a synchronization unit, operatively connected to the memory unit and responsive to a first clock and a second clock, for controlling the first clock to synchronize with the serial data when the serial data communication is carried out, and controlling the second clock to synchronize with the serial data when the serial data communication is not carried out; a communication control unit, operatively connected to the synchronization unit, for counting the first clock, when the counted value is within a value defined by the arbitrarily set bit length, indicating a first duration in which the controller is permitted to effect the serial data communication, and when the counted value is out of the value defined by the bit length, indicating a second duration in which the controller is inhibited to effect the serial data communication; and an output control unit, operatively connected to the memory unit, communication control unit and synchronization unit, for taking data of the arbitrarily set bit length out of the serial data stored in the memory unit when the first duration is indicated, to effect the serial data communication, and inhibiting the transmitting of the serial data when the second duration is indicated.

Furthermore, according to another aspect of the present invention, there is provided a serial data communication system including the above controller(s) provided in a transmitting side and/or in a receiving side thereof.

BRIEF DESCRIPTION OF THE DRAWINGS

Other objects and features of the present invention will be described hereinafter in detail by way of preferred embodiments with reference to the accompanying drawings, in which:

FIGS. 2a-2c, 3, 4a-4b, 5a-5b, and 6 are diagrams illustrating applications of the controller of the present invention;

FIG. 8 is a diagram showing the signal waveform at each point (node) in FIGS. 7a and 7b;

FIGS. 14 and 15a-15h are timing charts illustrating the serial data transmitting operation;

DESCRIPTION OF THE PREFERRED EMBODIMENTS

Figure 1:
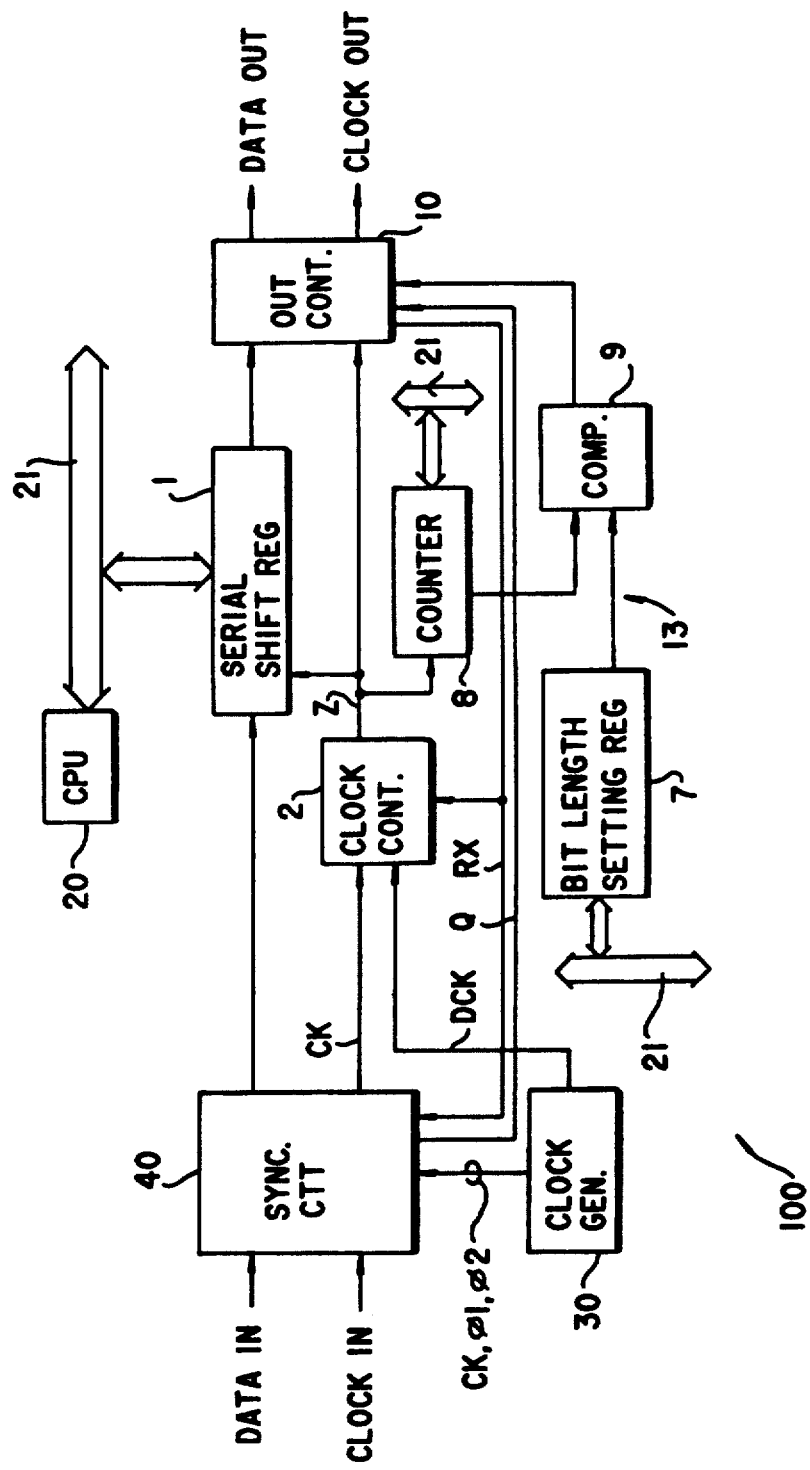
FIG. 1 is a block diagram illustrating the fundamental constitution of the serial data communication controller according to the present invention.

The fundamental constitution of the controller for effecting a serial data communication will be explained with reference to FIG. 1.

The controller 100 of the present embodiment is incorporated in a microcomputer in the form of one chip as described later, and controls the transmitting and receiving of a serial data of arbitrary bit length. The controller 100 includes a serial shift register 1, a clock controller 2, a bit length setting register 7, a counter 8, a comparator 9, an output controller 10, a clock generator 30, and a synchronization circuit 40.

The clock generator 30 generates three kinds of clocks CK, $\phi 1$ and $\phi 2$. The clock CK is employed as a shift clock for shifting each bit of a serial data in the serial shift register 1. Note, where the shift clock is fed from the outside of the chip, i.e., where an external clock is employed as the shift clock, the clock CK (internal clock) is not employed. The clock $\phi 1$ is employed as a dummy clock (DCK) for shifting each bit of the serial data, and employed as a control clock for synchronizing the clocks CK and DCK with the serial data. The clock $\phi 2$ is also employed as a control clock for the synchronization. Note, the clocks $\phi 1$ and $\phi 2$ are generated in synchronization with the internal clock CK.

The synchronization circuit 40 receives the clocks CK, $\phi 1$ and $\phi 2$ and controls the shift clock CK (internal clock or external clock) to synchronize with the dummy clock DCK. Note, where the internal clock (CK) is selected, the synchronization operation is not carried out (i.e., the synchronization is unnecessary). The synchronization circuit 40 also controls a serial data input from the outside to synchronize with the shift clock CK. Also, the synchronization circuit 40 receives a control signal RX from the output controller 10 and outputs a control signal Q to the output controller 10. Note, the control signal RX is employed as an output enable signal of the shift clock CK with respect to the synchronization circuit 40, and employed as a selection signal of the shift clock CK or dummy clock DCK with respect to the clock controller 2. Also, the control signal Q is employed as an output enable signal of the serial data and the shift clock or dummy clock.

The serial shift register 1 is connected via an internal bus 21 to a CPU (central processing unit) 20 provided within the identical chip, and has a function of serially storing data of a predetermined bit length (in the present example, 8-bit length) which is an object of the serial data communication. In this case, the data to be stored in the serial shift register 1 is fed from the internal bus 21 where the controller 100 is provided in the transmitting side of the serial data communication system, and fed from the outside via the synchronization circuit 40 where the controller 100 is provided in the receiving side of the system.

The clock controller 2 selects one of the shift clock CK and the dummy clock DCK in response to the selection signal RX from the output controller 10 and, in cooperation with the synchronization circuit 40, controls synchronization of the clocks CK and DCK with respect to the serial data stored in the serial shift register 1. In this case, the shift clock CK is controlled to synchronize with the serial data when the serial data communication is carried out, and the dummy clock DCK is controlled to synchronized with the serial data when the serial data communication is not carried out.

The bit length setting register 7 is connected to the internal bus 21, and has a function of arbitrarily setting a bit length of data (in the present example, 8-bit length at maximum) to be really transmitted or received, among the serial date of 8-bit length stored in the serial shift register 1.

The counter 8 is connected to the internal bus 21, and counts the clock Z (shift clock CK or dummy clock DCK) selectively output from the clock controller 2. The comparator 9 compares a value counted by the counter 8 with values set by the bit length setting register 7 and, when the counted value coincides with the set values, outputs a coincidence indication signal to the output controller 10. Note, the counter 8 and comparator 9 constitute a communication control unit 13. The output controller 10 receives the coincidence indication signal from the comparator 9 and outputs the control signal RX to the clock controller 2 and the synchronization circuit 40 and, then, receives the control signal Q from the synchronization circuit 40 and controls the outputting of the clock Z and the serial data or the inhibition of the outputting thereof.

FIGS. 2a to 6 illustrate applications of the controller 100 shown in FIG. 1.

FIG. 2a illustrates an application to the system including two microcomputers S and R1 each incorporating the CPU 20 together with the (serial) controller 100. In this case, one controller 100 (S or R1) effects a serial data communication between the other controller 100 (R1 or S) in synchronization with an internal clock generated therein or an external clock fed from the other controller 100. For example, each controller 100 transmits a serial data in response to a falling edge of the clock output (see FIG. 2b), and receives a serial data in response to a rising edge of the clock input (see FIG. 2c).

Figure 3:
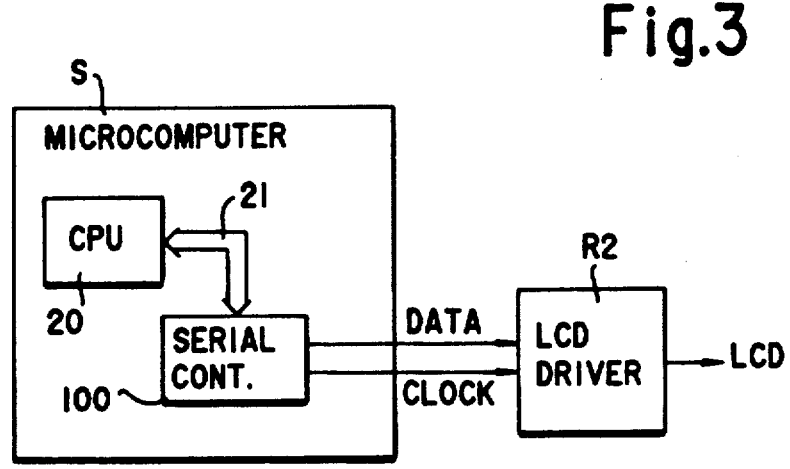

FIG. 3 illustrates an application to the system including a microcomputer S incorporating the CPU 20 together with the (serial) controller 100, and a driver R2 for a liquid crystal device (LCD). In this case, the LCD driver R2 includes a simple control unit or controller (not shown) and can receive a clock and a serial data from the serial controller 100 under control of the controller.

FIG. 4a illustrates an application to the system including a microcomputer S' incorporating the CPU 20 and parallel controller 110 together with the (serial) controller 100, and an electrically erasable and programmable read only memory (EEPROM) R3. In this case, a clock and a serial data fed from the serial controller 100 are employed as a write enable signal (active low signal WEX) and a chip enable signal (active low signal CEX), respectively, of the EEPROM chip. For example, as shown in FIG. 4b, when the serial data CEX is lowered to "L" level, the EEPROM R3 is activated, and then carries out the write operation (or read operation) based on the address information when the clock WEX is at "L" level (or "H" level).

Figure 5A:
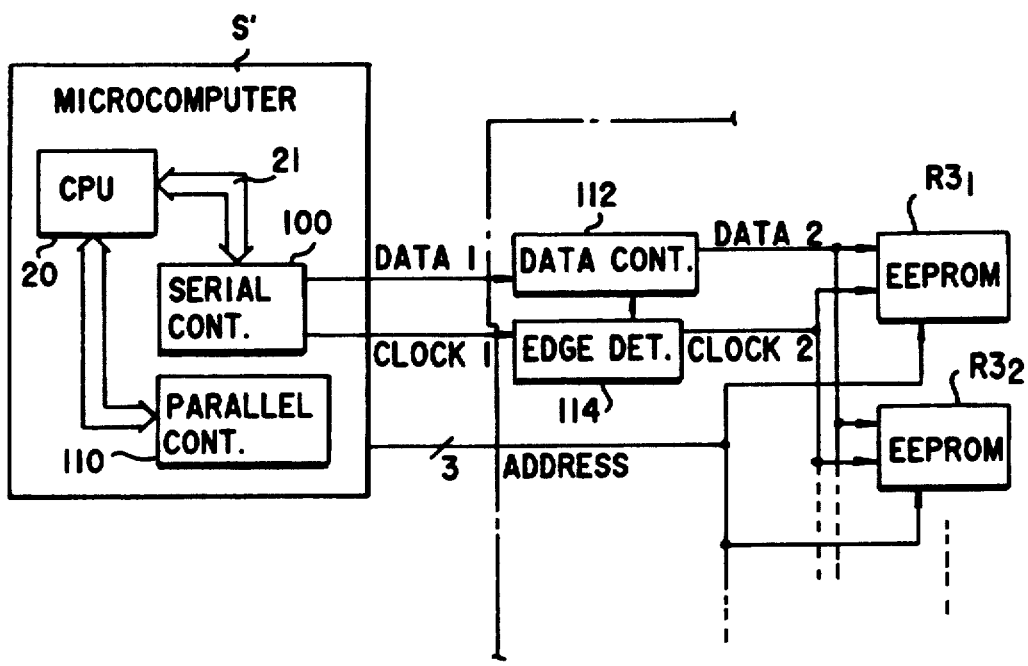
Figure 5B:
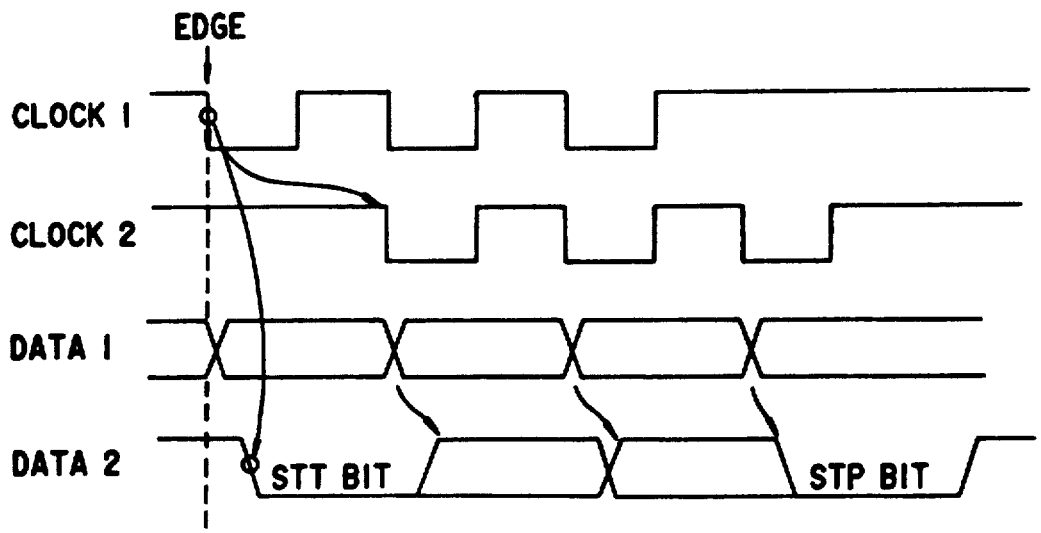

FIG. 5a illustrates a modification of the application shown in FIG. 4a. In this case, the chip under control includes a plurality of EEPROMs R3$_1$, R3$_2$, ..., an edge detector 114 for detecting a falling edge of a clock 1 fed from the serial controller 100, and a serial shift register 112 (data controller) for temporarily latching a serial data 1 fed from the serial controller 100 and shifting the data in response to an output of the edge detector 114. For example, as shown in FIG. 5b, when a falling edge of the clock 1 is detected, the data controller 112 sets the data 2 at the edge detection as a start bit. After the setting, each EEPROM receives the serial data 2 based on the address information in response to the clock 2. When the data controller 112 detects a stop bit of the data 2, it makes the data 2 "H" level. At this time, the serial data receiving is terminated. Note, the explanation of the start bit and stop bit will be described later.

Figure 6:
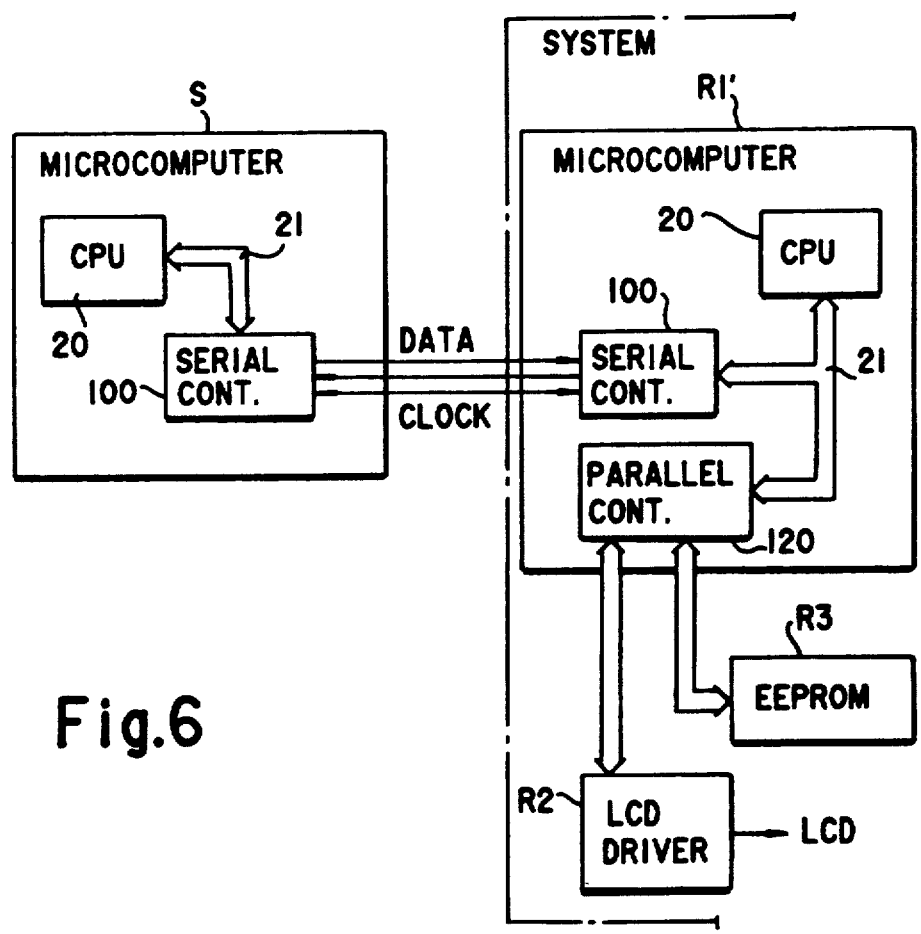

FIG. 6 illusrtates an application to a combination of the applications shown in FIGS. 2a, 3 and 4a. In this case, the system (chip) under control includes a microcomputer R1' incorporating the CPU 20 and parallel controller 120 together with the (serial) controller 100, the LCD driver R2 and the EEPROM R3.

Next, the circuit constitution of each block shown in FIG. 1 will be explained with reference to FIGS. 7a to 9.

Figure 7A:
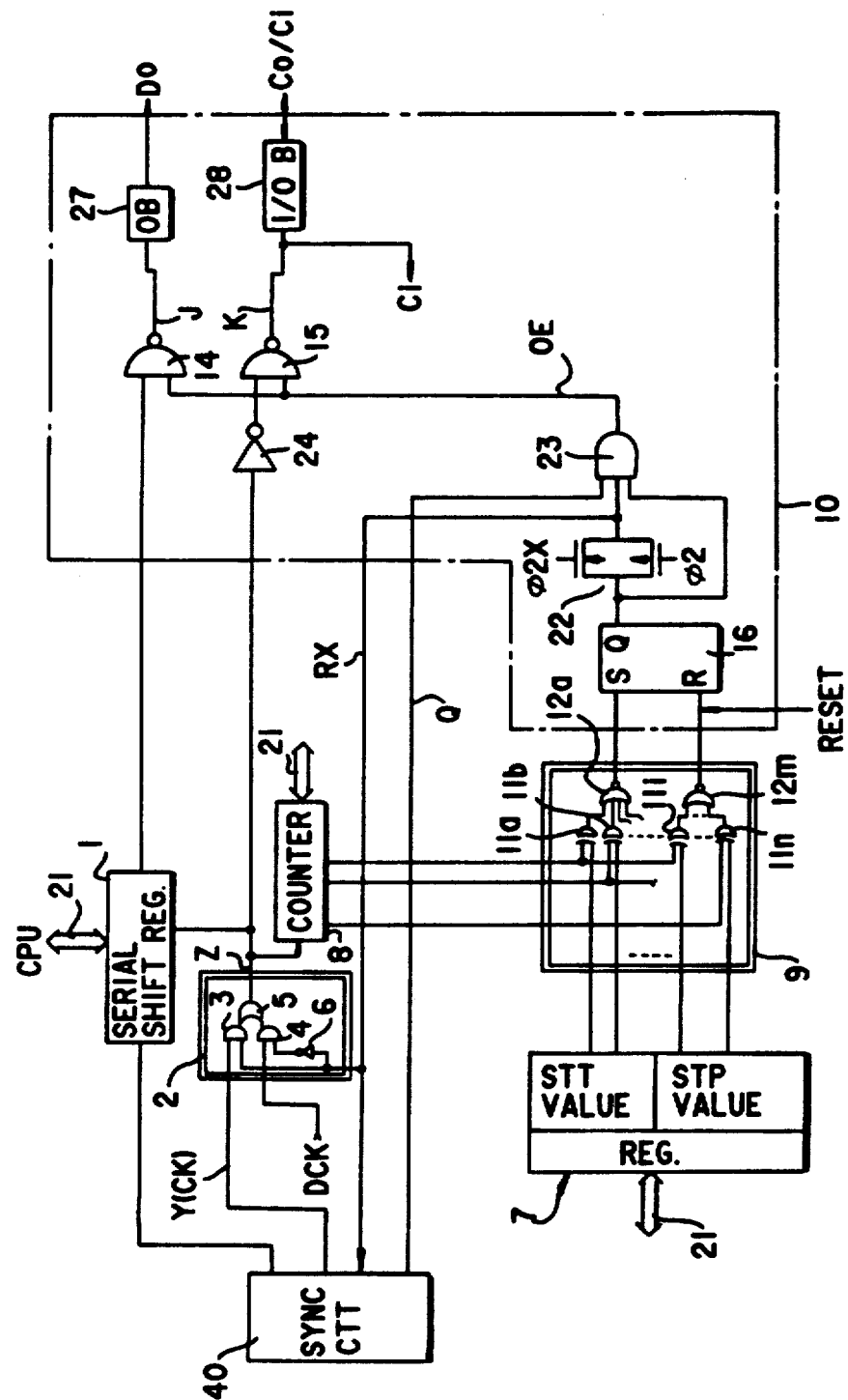
FIGS. 7a and 7b are circuit diagrams each illustrating the internal constitution of each block shown in FIG. 1.

Referring to FIG. 7a, the clock controller 2 is constituted by an inverter 6 responsive to the selection signal RX from the output controller 10, an AND gate 3 responsive to the selection signal RX and the shift clock CK, an AND gate 4 responsive to an output of the inverter 6 and the dummy clock DCK, and an OR gate 5 responsive to each output of the AND gates 3, 4 and forming the clock Z. In the illustration, when the selection signal RX is at "H" level (or "L" level), the shift clock CK (or dummy clock DCK) is selected as the clock Z. The bit length setting register 7 sets positions of the start bit and stop bit of the data to be really transmitted or received, and thus arbitrarily sets a bit length of the data. The start bit position and stop bit position are defined by data of a start value and a stop value, which are fed via the bus 21 from the CPU 20.

The comparator 9 is constituted by a plurality of exclusive-OR gates 11a, 11b, ..., each responsive to a value in the counter 8 and a start value in the bit length setting register 7, an NOR gate 12a responsive to each output of the gates 11a, 11b, ..., a plurality of exclusive-OR gates 11i to 11n, each responsive to a value in the counter 8 and a stop value in the bit length setting register 7, and an NOR gate 12m responsive to each output of the gates 11i to 11n. When the counted value coincides with the set start value, the NOR gate 12a outputs a signal of "H" level (coincidence indication signal) and, when the counted value coincides with the set stop value, the NOR gate 12m outputs a signal of "H" level (coincidence indication signal). The communication control unit 13 constituted by the counter 8 and comparator 9 counts the clock Z and, when the counted value is within a value defined by the bit length set by the bit length setting register 7, indicates that the controller 100 is permitted to effect the serial data communication (serial data communication duration). On the other hand, when the counted value is out of the value defined by the bit length, the communication control unit 13 indicates that the controller 100 is inhibited to effect the serial data communication (dummy duration). In this case, the duration from when the NOR gate 12a outputs the coincidence indication signal until when the NOR gate 12m outputs the coincidence indication signal corresponds to the serial data communication duration, and the duration else corresponds to the dummy duration.

The output controller 10 is constituted by a flip-flop 16 receiving the outputs of the NOR gate 12a, 12m at its set input (S) and reset input (R), respectively, a transfer gate 22 receiving an output (Q) of the flip-flop 16, consisting of a p-channel MOS transistor responsive to the clock $\phi 2$ and an n-channel MOS transistor responsive to the complementary clock $\phi 2X$, and AND gate 23 responsive to the output of the flip-flop 16, the output (control signal RX) of the transfer gate 22 and the control signal Q, an inverter 24 responsive to the clock Z, a NAND gate 14 responsive to an output (output enable signal OE) of the AND gate 23 and the serial data, a NAND gate 15 responsive to the output enable signal OE and an output of the inverter 24, an output buffer 27 responsive to an output (J) of the NAND gate 14 and forming the serial data output Do, and an input/output buffer 28 responsive to an output (K) of the NAND gate 15 and forming the clock output Co, or receiving an external clock Ci. Note, the flip-flop 16 can also be reset by an external reset signal (RESET) when necessary.

In the above constitution, when the controller 100 is in the serial data communication duration, the output (Q) of the flip-flop 16 is at "H" level. In this state, when the output enable signal Q from the synchronization circuit 40 is at "H" level, the "H" level output (Q) of the flip-flop 16 is input via the transfer gate 22 to the AND gate 23 at the falling of the synchronization control clock $\phi 2$. Accordingly, the output enable signal OE is made "H" level according to ON/OFF operation of the transfer gate 22. Namely, the output enable signal OE is also in synchronization with the clocks CK and DCK.

Figure 7B:
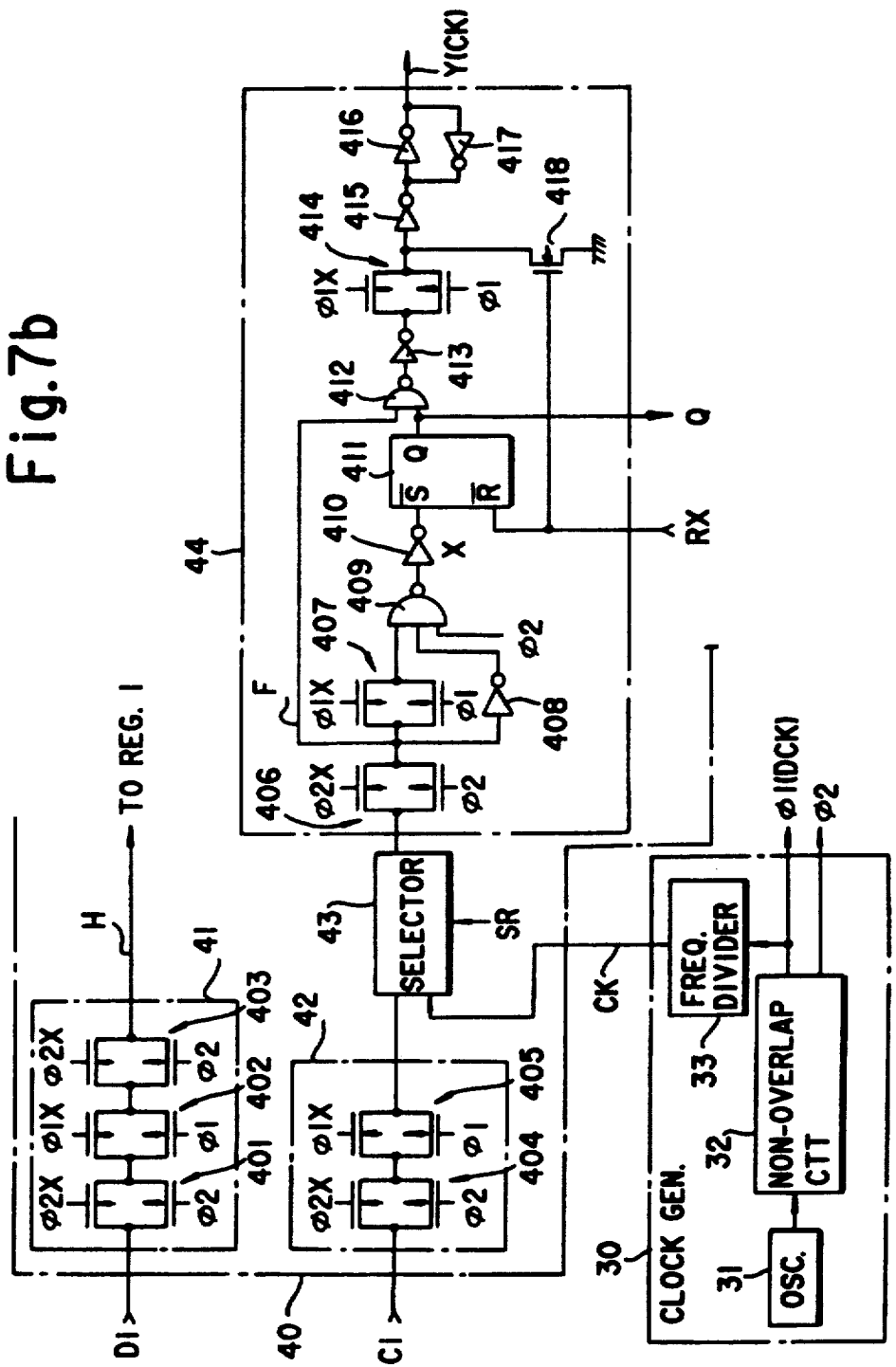

Next, referring to FIG. 7b, the clock generator 30 is constituted by an oscillator 31 such as a crystal oscillator, an non-overlapping circuit 32 responsive to an output of the oscillator 31 and forming the clocks $\phi 1(DCK)$ and $\phi 2$, and a frequency divider 33 responsive to the clock $\phi 1$ and forming the internal shift clock CK.

The synchronization circuit 40 is constituted by a synchronization block 41 for synchronizing a serial data input Di with the dummy clock DCK and transmitting the synchronized data to the serial shift register 1, a synchronization block 42 for synchronizing an external clock input Ci with the dummy clock DCK, a selector 43 for selecting the synchronized external clock or the internal shift clock CK according to a control signal SR which can be fed from the CPU 20, and a synchronization block 44 for synchronizing the selected clock with the dummy clock DCK and transmitting the synchronized clock Y(CK) to the block controller 2. The synchronization block 44 receives the output enable signal RX and controls the outputting of the clock Y(CK) or the inhibition of the outputting thereof.

The synchronization block 41 includes a transfer gate 401 responsive to the clock $\phi 2(\phi 2X)$ and receiving the serial data input Di, a transfer gate 402 responsive to the clock $\phi 1(\phi 1X)$ and receiving an output of the transfer gate 401, and a transfer gate 403 responsive to the clock $\phi 2(\phi 2X)$ and transmitting an output of the transfer gate 402 to the serial shift register 1. The synchronization block 42 includes a transfer gate 404 responsive to the clock $\phi 2(\phi 2X)$ and receiving the external clock input Ci, and a transfer gate 405 responsive to the clock $\phi 1(\phi 1X)$ and transmitting an output of the transfer gate 404 to the selector 43.

Also, the synchronization block 44 includes a transfer gate 406 responsive to the clock $\phi 2(\phi 2X)$ and receiving the output of the selector 43, a transfer gate 407 responsive to the clock $\phi 1(\phi 1X)$ and receiving an output of the transfer gate 406, an inverter 408 responsive to the output of the transfer gate 406, a NAND gate 409 responsive to an output of the inverter 408, an output of the transfer gate 407 and the clock $\phi 2$, an inverter 410 responsive to an output of the NAND gate 409, a flip-flop 411 receiving an output (X) of the inverter 410 at its set input (S) and receiving the output enable signal RX at its reset input (R), a NAND gate 412 responsive to an output Q of the flip-flop 411 and the output (F) of the transfer gate 406, an inverter 413 responsive to an output of the NAND gate 412, a transfer gate 414 responsive to the clock $\phi 1(\phi 1X)$ and receiving an output of the inverter 413, an inverter 415 responsive to an output of the transfer gate 414, an inverter 416 responsive to an output of the inverter 415 and forming the clock CK, an inverter 417 inversely connected to the inverter 416, and an n-channel channel MOS transistor 418 responsive to the output enable signal RX and pulling down the potential at the output of the transfer gate 414.

Note, each transfer gate consists of a p-channel MOS transistor responsive to the clock $\phi 1(\phi 2)$ and an n-channel MOS transistor responsive to the complementary clock $\phi 1X(\phi 2X)$. Also, an example of the signal waveform at each point (node) in FIGS. 7a and 7b is shown in FIG. 8.

Figure 9:
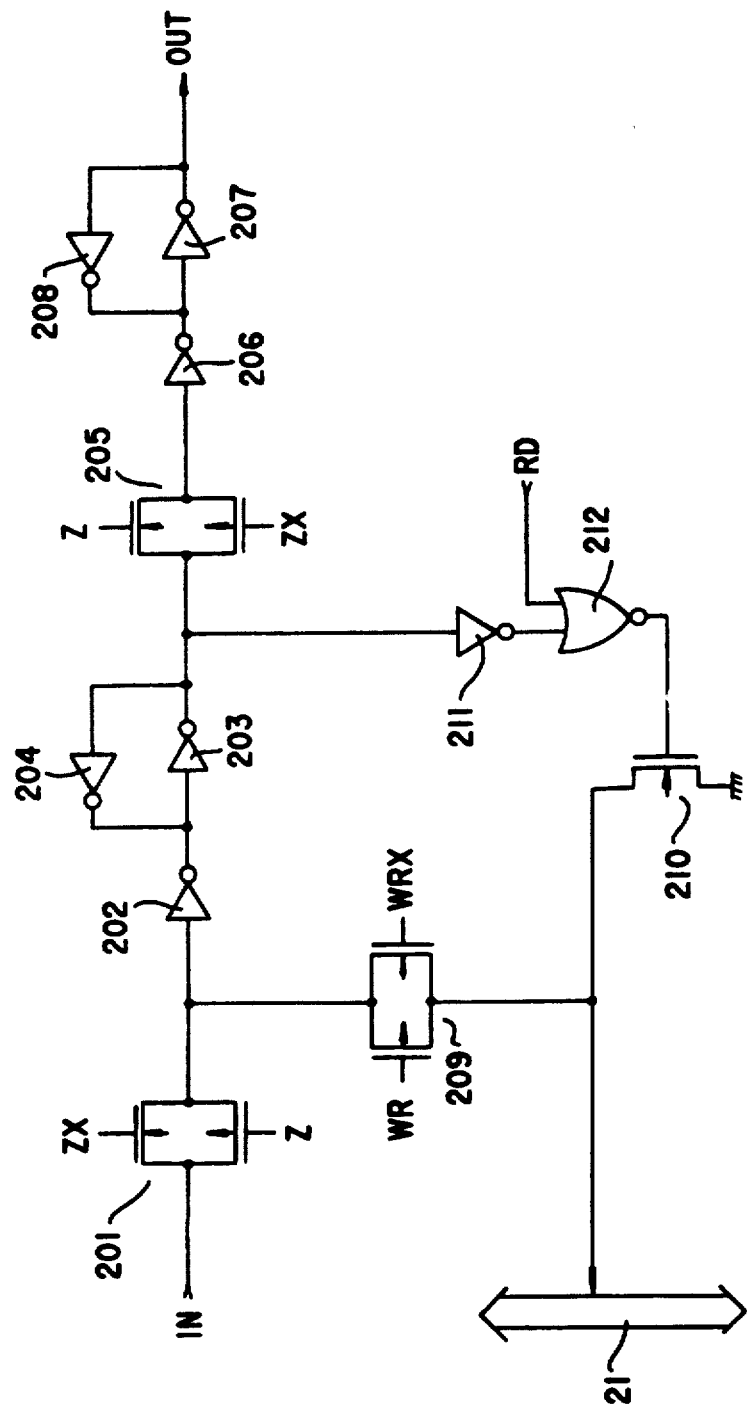
FIG. 9 is a circuit diagram illustrating the constitution corresponding to one stage of the serial shift register shown in FIG. 1.

Next, referring to FIG. 9, one stage of the serial shift register 1 is constituted by a transfer gate 201 responsive to the clock Z(ZX) and receiving the data input, an inverter 202 responsive to an output of the transfer gate 201, a latch (inverters 203, 204) responsive to an output of the inverter 201, a transfer gate 205 responsive to the clock ZX(Z) and receiving an output of the latch (203, 204), an inverter 206 responsive to an output of the transfer gate 205, a latch (inverters 207, 208) responsive to an output of the inverter 206 and forming the data output, a transfer gate 209 responsive to a write clock WR(WRX) and connected between the bus 21 and the input of the inverter 202, an n-channel MOS transistor 210 connected between the bus 21 and the ground, an inverter 211 responsive to the output of the latch (203, 204), and a NOR gate 212 responsive to an output of the inverter 211 and a read signal RD and driving a gate of the transistor 210. Note, each transfer gate 201, 205, 209 consists of a p-channel MOS transistor responsive to the clock Z, ZX, WR and an n-channel MOS transistor responsive to the complimentary clock ZX, Z, WRX.

In the above constitution, when the shift clock Z is at "L" level, the input data is taken in the latch (203, 204) and, when the shift clock Z is at "H" level, the latched data is output through the latch (207, 208) to the outside. Also, when the write clock WR is at "L" level, data on the bus 21 is written in the serial shift register and, when the read clock RD is at "L" level, the latched data is transmitted to the bus 21.

Next, embodiments of the present invention will be explained with reference to FIGS. 10 to 13.

Figure 10:
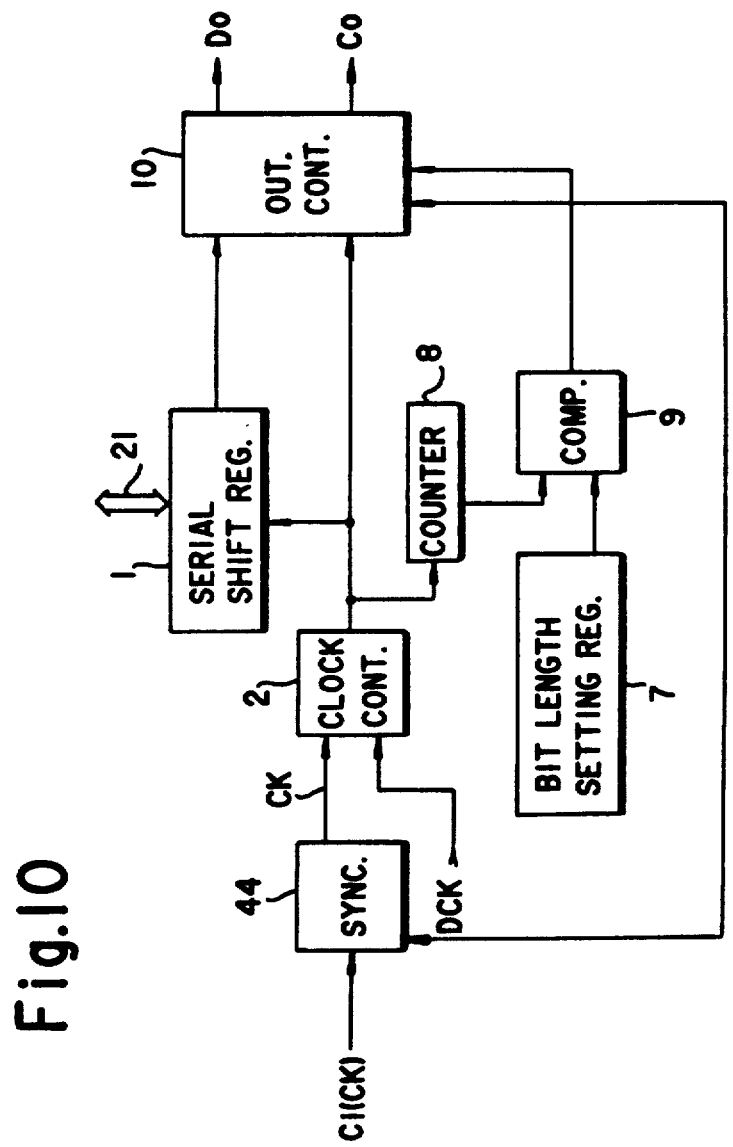
FIG. 10 is a block diagram illustrating the constitution of a first embodiment of the present invention, using the internal clock and provided in the transmitting side of the serial data communication system.

FIG. 10 illustrates the constitution of the controller according to a first embodiment, which is provided in the transmitting side of the system (e.g., see FIGS. 2a to 6, the serial controller 100 in the microcomputer S,S').

In the present embodiment, the controller employs the internal clock CK generated within the chip. As described before, since the dummy clock DCK is generated in synchronization with the internal clock CK, the control for the synchronization of the clocks is unnecessary. On the other hand, the serial data output from the serial shift register 1 is made synchronized with the clock (CK or DCK) output from the clock controller 2 by the output controller 10 under control of the synchronization block 44. Accordingly, the serial data output Do is in synchronization with the clock output Ci. Also, it is possible to transmit data of an arbitrary bit length among the serial data of 8-bit length by the cooperation of the bit length setting register 7, counter 8 and comparator 9.

Figure 11:
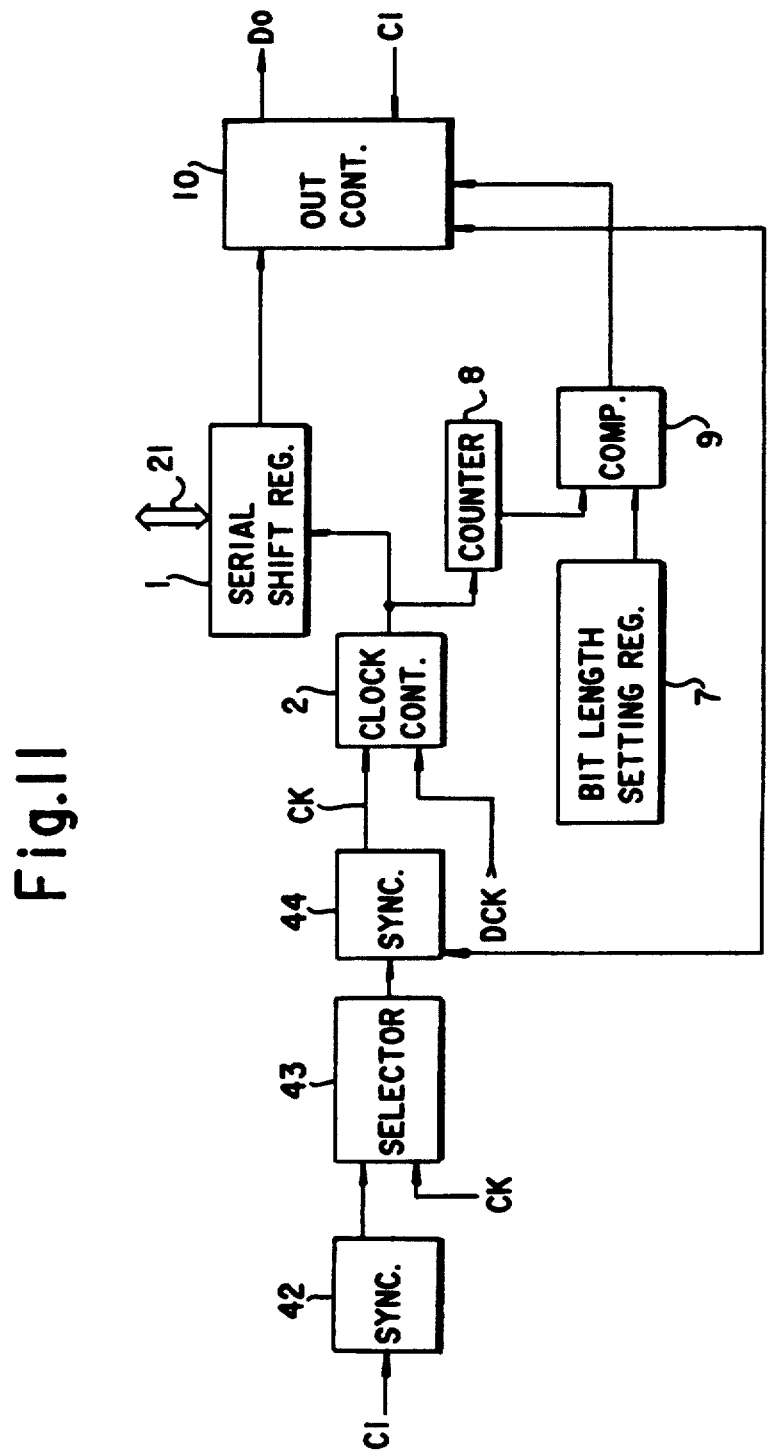
FIG. 11 is a block diagram illustrating the constitution of a second embodiment using the external clock and provided in the transmitting side of the system.

FIG. 11 illustrates the constitution of the controller according to a second embodiment, which is provided in the transmitting side of the system (e.g., see FIGS. 2a, 6, the serial controller 100 in the microcomputer S).

In the present embodiment, the controller employs the external clock Ci fed from the other chip. In this case, the control for synchronizing the (asynchronous) external clock Ci with the dummy clock DCK internally generated is necessary. In this regard, the synchronization blocks 42 and 44 are provided. The selector 43 is also provided to select the external clock Ci or the internal clock CK. As well as the case of FIG. 10, the serial data is made synchronized with the clock (CK or DCK) by the output controller 10, and data of an arbitrary bit length among the serial data of 8-bit length can be transmitted by the cooperation of the register 7, counter 8 and comparator 9.

Figure 12:
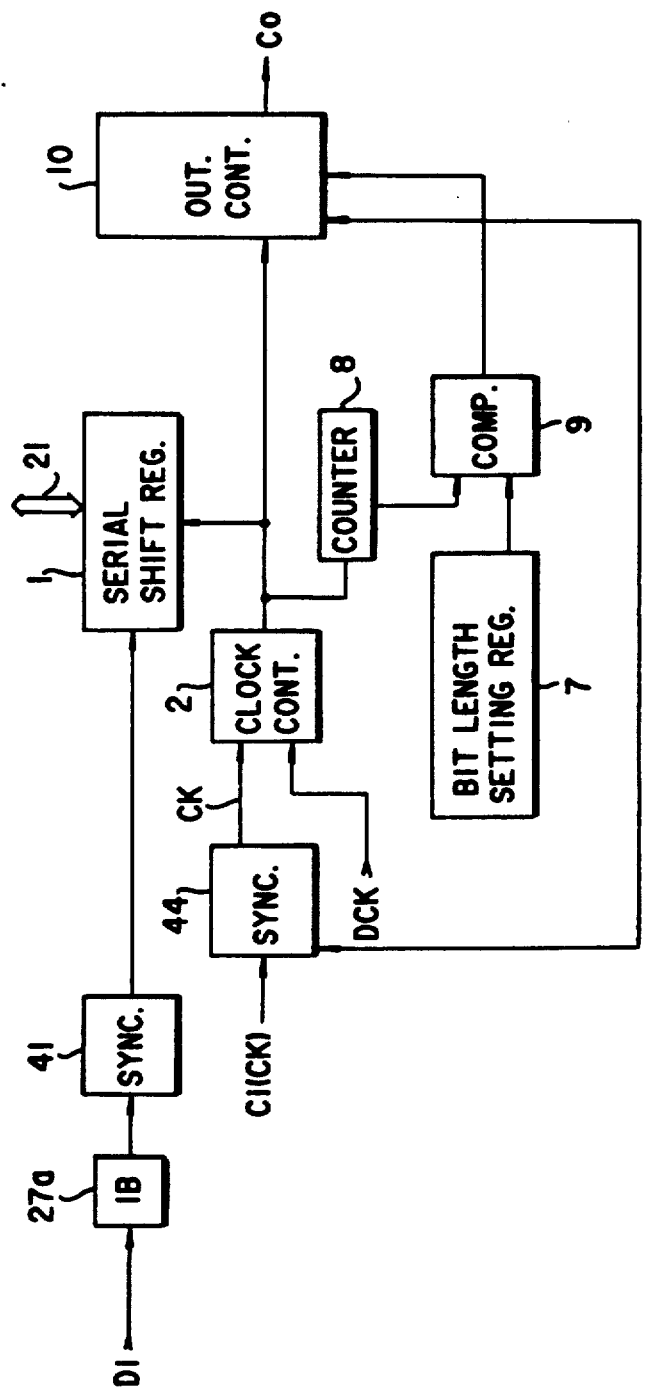
FIG. 12 is a block diagram illustrating the constitution of a third embodiment using the internal clock and provided in the receiving side of the system.

FIG. 12 illustrates the constitution of the controller according to a third embodiment, which is provided in the receiving side of the system (e.g., see FIGS. 2a, 6, the serial controller 100 in the microcomputer R1,R1').

In the present embodiment, the controller employs the internal clock CK generated within the chip. In this case, the control for the synchronization of the clocks CK and DCK is unnecessary. However, since the serial data received from the outside of the chip is asynchronous with the dummy clock DCK internally generated, the control for the synchronization of the serial data is necessary. In this regard, the synchronization block 41 is provided together with an input buffer 27a. Accordingly, the serial data to be taken in the serial shift register 1 is in synchronization with the clock (CK or DCK) output from the clock controller 2. Also, it is possible to receive data of an arbitrary bit length among the serial data of 8-bit length in the serial shift register 1 by the cooperation of the bit length setting register 7, counter 8 and comparator 9.

Figure 13:
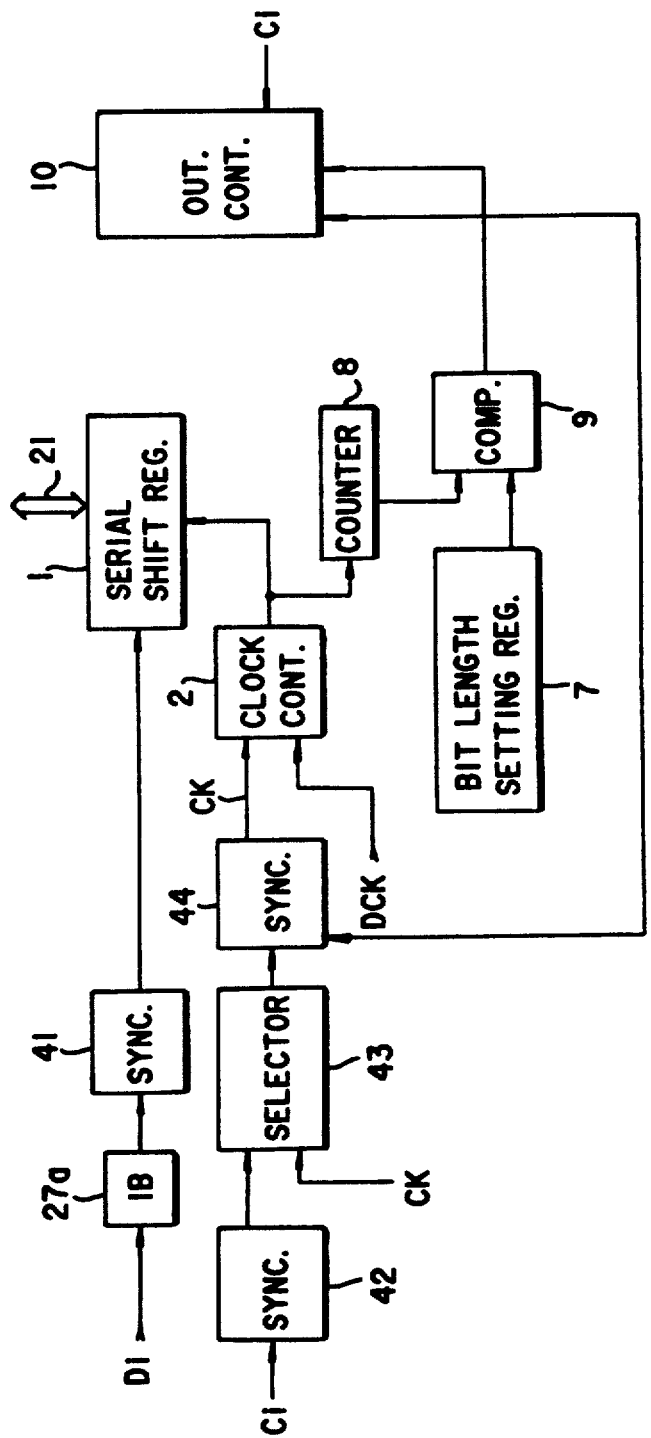
FIG. 13 is a block diagram illustrating the constitution of a fourth embodiment using the external clock and provided in the receiving side of the system.

FIG. 13 illustrates the constitution of the controller according to a fourth embodiment, which is provided in the receiving side of the system (e.g., see FIGS. 2a, 6, the serial controller 100 in the microcomputer R1,R1').

In the present embodiment, the controller employs the external clock Ci fed from the other chip. In this case, the control for synchronizing the asynchronous external clock Ci together with the asynchronous input serial data Di with the dummy clock DCK internally generated is necessary. In this regard, the synchronization blocks 41, 42 and 44 are provided. The selector 43 is also provided to select the external clock Ci or the internal clock CK. As well as the case of FIG. 12, the serial data to be taken in the serial shift register 1 is made synchronized with the clock (CK or DCK), and data of an arbitrary bit length among the serial data of 8-bit length in the serial shift register 1 can be received.

Next, the serial data communication operation will be explained with reference to FIGS. 14 to 18.

Figure 14:
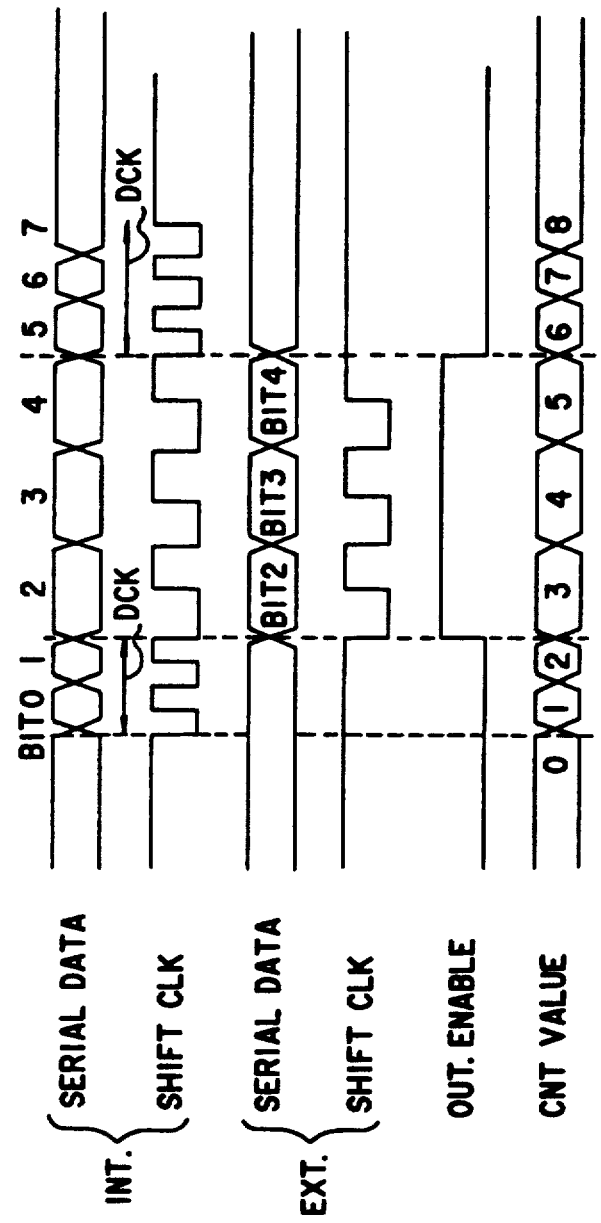

FIG. 14 shows an example of the serial data transmitting operation, in which data of three bits (bit 2 to bit 4) among the data of 8-bit length is transmitted.

First, the bit length setting register 7 sets a bit position 2 as the start value and a bit position 4 as the stop value. Note, the serial data of 8-bit length is represented by bit 0 to bit 7. Next, the serial data communication operation is started and the controller starts the shift and count operation by means of the dummy clock DCK selected by the clock controller 2.

When the comparator 9 detects a coincidence of a value of the counter 8 with the start value, the clock controller 2 switches the shift clock to the clock CK for the serial data communication, so that the controller effects the shift and count operation by means of the selected shift clock CK. At this time, the output enable signal (OE) is made "H" level and the data of bit 2 to bit 4 together with the shift clock is output to the external.

When the outputting of the data of bit 4 is terminated, the comparator 9 detects a coincidence of a value of the counter 8 with the stop value. At this time, the output enable signal (OE) is made "L" level and the outputting of the serial data and shift clock is stopped or inhibited. Also, the clock controller 2 switches the shift clock to the dummy clock DCK again and thus the controller continues to effect the shift and count operation by means of the dummy clock DCK until eight bits are counted. After the counting of the eight bits, the shift and count operation is stopped.

As explained above, data of an arbitrary bit length (bit 2 to bit 4) among the data of 8-bit length is transmitted in the serial data communication duration, and the shift operation of the serial data is carried out by means of the dummy clock in the dummy duration. Accordingly, it is possible to reduce time required for the data communication (transmitting).

Note, it is also possible not to carry out the shift operation by the dummy clock after the outputting of the data of bit 4 is terminated.

Other examples of the serial data transmitting operation are shown in FIGS. 15a to 15h. The illustration shows the case in which data of two bits (hatched portion) among the data of 4-bit length is transmitted.

Figure 16:
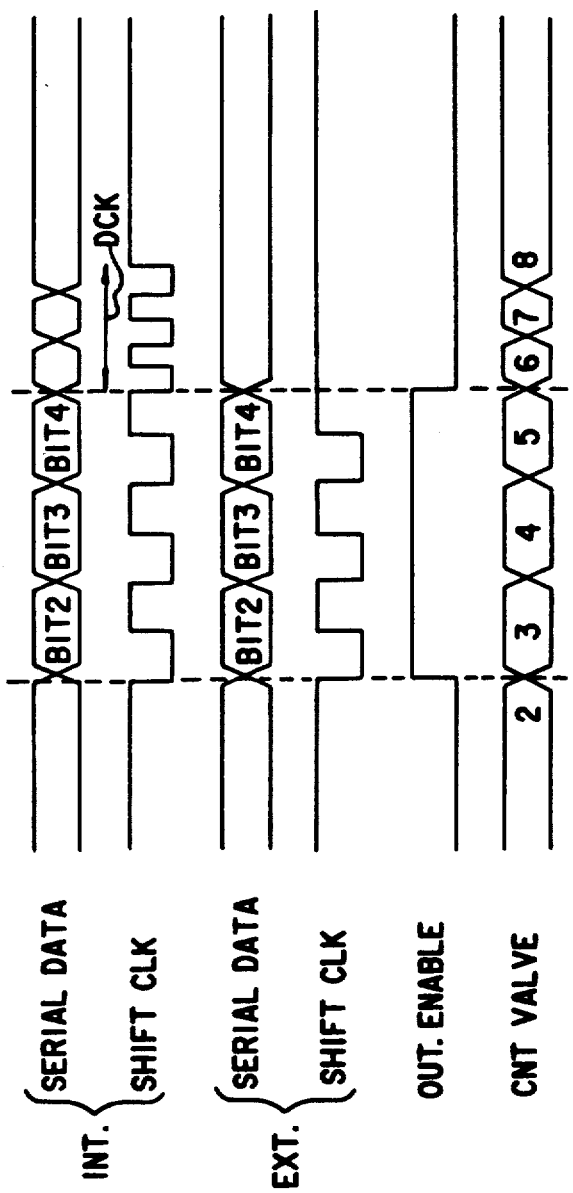
FIGS. 16 and 17a-17f are timing charts illustrating the serial data receiving operation.
Figure 17D:
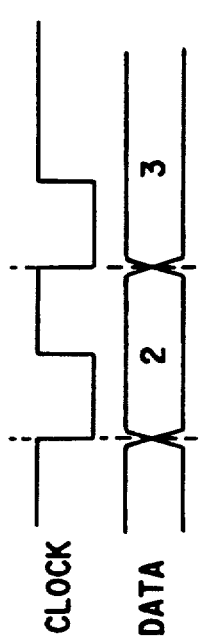
Figure 17E:
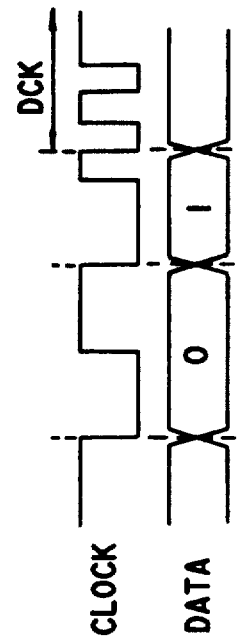
Figure 17F:
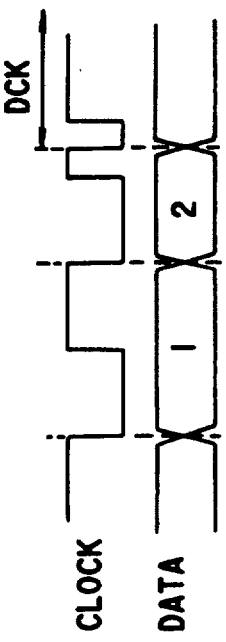
Figure 17A:
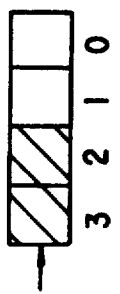
Figure 17B:
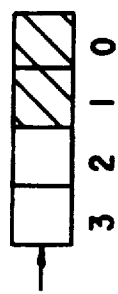
Figure 17C:
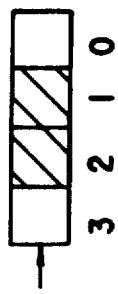

FIG. 16 shows an example of the serial data receiving operation, in which data of three bits (bit 2 to bit 4) among the data of 8-bit length is received.

First, the counter 8 sets a value 3 as the start value and the bit length setting register 7 sets a bit position 4 as the stop value. The shift and count operation is started upon receipt of the serial data and shift clock from the external. At this time, the counter 8 starts the counting operation from the set value.

Next, when the comparator 9 detects a coincidence of a value of the counter 8 with the stop value, the clock controller 2 switches the shift clock to the dummy clock DCK, so that the effects the shift and count operation by means of the dummy clock DCK. When the value of the counter 8 reached eight (bits), the shift and count operation is terminated.

Therefore, data of an arbitrary bit length (bit 2 to bit 4) among the data of 8-bit length in the serial shift register 1 is received in the serial data communication duration, and the shift operation of the serial data is carried out by means of the dummy clock in the dummy duration. Thus, it is possible to reduce time required for the data communication (receiving). In particular, it is possible to simplify the receiving processing of the serial data and thus lighten a burden to the controller due to software processing.

Other examples of the serial data receiving operation are shown in FIGS. 17a to 17f. The illustration shows the case in which data of two bits (hatched portion) among the data of 4-bit length is received.

Figure 18:
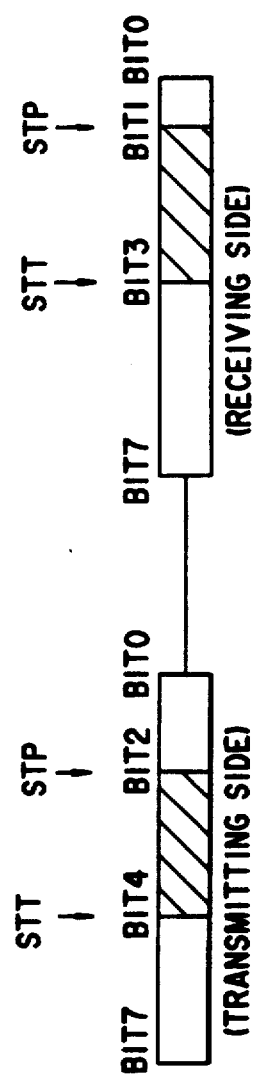
FIG. 18 is an explanatory view of another example of the serial data communication operation.

Additionally, as shown in FIG. 18, it is possible to bring the bit positions of data to be really transmitted or received to arbitrary bit positions by suitably changing the start value and stop value in the transmitting side and receiving side, respectively.

Although, in the above described embodiments, the serial data communication of data beginning from the LSB (bit 0) is explained, it is not restrictive. A serial data communication of data beginning from the MSB (bit 7) is also possible.

Although the present invention has been disclosed and described by way of several embodiments, it is apparent to those skilled in the art that other embodiments and modifications of the present invention are possible without departing from the spirit or essential features thereof.

I claim:

1. A controller provided in a receiving side of a serial data communication system and receiving serial data from a transmitting side thereof, the controller comprising:

a memory means connected to an internal bus, for serially storing data of a predetermined bit length of the serial data communication;

a bit length setting means for arbitrarily setting a bit length of data to be received from the memory means;

a synchronization means, operatively connected to the memory means and responsive to a) serial data from the transmitting side, b) a first clock and c) a second clock, said synchronization means for synchronizing the serial data with the first clock when the serial data communication is carried out, and for synchronizing the serial data with the second clock when the serial data communication is not carried out; and a communication control means, operatively connected to the synchronization means, said communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication, wherein when the first duration is indicated by said communication control means, data of said arbitrarily set bit length is taken out of the serial data stored in the memory means and received in the internal bus, and when the second duration is indicated by said communication control means, receiving the serial data by the internal bus in inhibited.

2. A controller as set forth in claim 1, further comprising a clock generating means for generating a contol clock for synchronization, the second clock and an internal clock in synchronization with the second clock.

3. A controller as set forth in claim 2, wherein the communication control means comprises a counter for counting the first and second clocks and a comparator for detecting whether a value counted by the counter coincides with a value corresponding to a bit position set by the bit length setting means, therein indicating the first duration or the second duration.

4. A controller as set forth in claim 3, wherein the counter and the bit length setting means are connected to the internal bus and, according to instructions fed via the internal bus, set a start bit position and a stop bit position, respectively, of said arbitrarily set bit length.

5. A controller as set forth in claim 4, wherein the synchronization means comprises a synchronization circuit responsive to the clocks from the clock generating means, effecting a synchronization of the serial data with the second clock and outputting the internal clock as the first clock, and a clock controller responsive to a control signal and selectively outputting the first clock output from the synchronization circuit of the second clock output from the clock generating means.

6. A controller as set forth in claim 5, wherein the clock controller selects the first clock from when the counter starts the counting operation until when the comparator detects a coincidence of a counted value in the counter with a value corresponding to the stop bit position in the bit length setting means.

7. A controller as set forth in claim 5, wherein the synchronization circuit comprises a synchronization block for synchronizing the serial data from the transmitting side with the second clock and transmitting the synchronized data to the memory means, and a synchronization block responsive to the control signal and controlling the outputting of the first clock to the clock controller or inhibition of the outputting thereof.

8. A controller as set forth in claim 5, wherein, where said first clock is fed from the transmitting side, the synchronization circuit controls the first clock to synchronize with the second clock.

9. A controller as set forth in claim 8, wherein the synchronization circuit comprises a synchronization block for synchronizing the serial data from the transmitting side with the second clock and transmitting the synchronized data to the memory means, a synchronization block for synchronizing the external clock with the second clock, a selector for selecting the synchronized external clock or the internal clock, and a synchronization block responsive to the control signal and controlling the outputting of the selected clock to the clock controller or inhibition of the outputting thereof.

10. A controller as set forth in claim 1, wherein the controller is incorporated together with a CPU connected to the internal bus in a microcomputer in a form of a chip.

11. A controller as set forth in claim 1, wherein the serial data in the memory means is shifted by the first clock in the first duration and by the second clock in the second duration, and a frequency of the second clock is selected higher than that of the first clock.

12. A controller provided in a transmitting side of a serial data communication system and transmitting a serial data to receiving side thereof, the controller comprising:

a memory means connected to an internal bus, for serially storing data of a predetermined bit length of the serial data communication;

a bit length setting means for arbitrarily setting a bit length of data to be transmitted from the memory means;

a synchronization means, operatively connected to the memory means and responsive to a first clock and a second clock, said synchronization means for synchronizing the serial data with the first clock when the serial data communication is carried out, and for synchronizing the serial data with the second clock when the serial data communication is not carried out;

a communication control means, operatively connected to the synchronization means, said communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communciation; and an output control means, operatively connected to the memory means, communication control means and synchronization means, said output control means for taking data of said arbitrarily set bit length out of the serial data stored in the memory means when the first duration is indicated by said communication control means, to effect the serial data communication, and for inhibiting the transmitting of the serial data when the second duration is indication by said communication control means.

13. A controller as set forth in claim 12, further comprising a clock generating means for generating a control clock for synchronization, the second clock and an internal clock in synchronization with the second clock.

14. A controller as set forth in claim 13, wherein the communication control means comprises a counter for counting the first and second clocks and a comparator for detecting whether a value counted by the counter coincides with a value corresponding to a bit position set by the bit length setting means, thereby indicating the first duration or the second duration.

15. A controller as set forth in claim 14, wherein the bit length setting means is connected to the internal bus and, according to instructions fed via the internal bus, sets a start bit position and a stop bit position of said arbitrarily set bit length.

16. A controller as set forth in claim 15, wherein the output control means comprises a gate circuit responsive to an output of the comparator and a control signal fed from the synchronization means in synchronization with the second clock and forming an output enable signal, whereby the outputting of the serial data or inhibition of the outputting thereof is controlled by means of the output enable signal.

17. A controller as set forth in claim 16, wherein the synchronization means comprises a synchronization circuit responsive to the clocks from the clock generating means, effecting a synchronization of the serial data with the second clock and outputting the internal clock as the first clock, and a clock controller responsive to a control signal and selectively outputting the first clock output from the synchronization circuit or the second clock output from the clock generating means.

18. A controller as set forth in claim 17, wherein the clock controller selects the first clock from when the comparator detects a coincidence of a counted value in the counter with a value corresponding to the start bit position in the bit length setting means until when the comparator detects a coincidence of a counted value in the counter with a value corresponding to the stop bit position in the bit length setting means.

19. A controller as set forth in claim 17, wherein the synchronization circuit comprises a synchronization block responsive to the control signal and controlling the outputting of the first clock to the clock controller or inhibition of the outputting thereof.

20. A controller as set forth in claim 17, wherein, where said first clock is fed from the receiving side, the synchronization circuit controls the first clock to synchronize with the second clock.

21. A controller as set forth in claim 20, wherein the synchronization circuit comprises a synchronization block for synchronizing the external clock with the second clock, a selector for selecting the synchronized external clock or the internal clock, and a synchronization block responsive to the control signal and controlling the outputting of the selected clock to the clock controller or inhibition of the outputting thereof.

22. A controller as set forth in claim 12, wherein the controller is incorporated together with a CPU connected to the internal bus in a microcomputer in a form of a chip.

23. A controller as set forth in claim 12, wherein the serial data in the memory means is shifted by the first clock in the first duration and by a second clock in the second duration, and a frequency of the second clock is selected higher than that of the first clock.

24. A serial data communication system including a microcomputer provided in a transmitting side thereof and a microcomputer provided in a receiving side thereof, each microcomputer including a controller and a CPU connected via an internal bus to the controller, wherein the controller in the transmitting side comprises:
a first memory means connected to the internal bus, for serially storing data of a predetermined bit length of the serial data communication;
a first bit length setting means for arbitrarily setting a bit length of data to be transmitted from the first memory means;
a first synchronization means, operatively connected to the first memory means and responsive to a first clock and a second clock, said synchronization means for synchronizing the serial data with the first clock when the serial data communciation is carried out, and for synchronizing the serial data with the second clock when the serial data communication is not carried out;
a first communication control means, operatively connected to the first synchronization means, said first communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication; and
an output control means, operatively connected to the first memory means, first communication control means and first synchronization means, said output control means for taking data of said arbitrarily set bit length out of the serial data stored in the first memory means when the first duration is indicated by said first communication control means, to effect the serial data communication, and for inhibiting the transmitting of the serial data when the second duration is indicated by said first communication control means, and the controller in the receiving side comprises:
a second memory means connected to the internal bus, for serially storing data of a predetermined bit length of the serial data communication;
a second bit length setting means for arbitrarily setting a bit length of data to be received from the second memory means;
a second synchronization means, operatively connected to the second memory means and responsive to a) serial data from the transmitting side, b) a first clock and c) a second clock, said second synchronizaton means for synchronizing the serial data with the first clock when the serial data communication is carried out, and for synchronizing the serial data with the second clock when the serial data communication is not carried out; and
a second communication control means, operatively connected to the second synchronization means, said second communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication, wherein, when the first duration is indicated by said second communication control means, data of said arbitrarily set bit length is taken out of the serial data stored in the second memory means and received in the internal bus, and when the second duration is indicated by the second communication control means, the receiving of the serial data is inhibited in the internal bus.

25. A serial data communication system including a microcomputer provided in a transmitting side thereof, the microcomputer including a controller and a CPU connected via an internal bus to the controller, and a driver for liquid crystal device provided in a receiving side thereof and receiving a serial data and a clock from the controller, wherein the controller comprises:

a memory means connected to the internal bus, for serially storing data of a predetermined bit length of the serial data communication;

a bit length setting means for arbitrarily setting a bit length of data to be transmitted from the memory means;

a synchronization means, operatively connected to the memory means and responsive to a first clock and a second clock, said synchronization means for synchronizing the serial data with the first clock when the serial data communication is carried out, and for synchronizing the serial data with the second clock when the serial data communication is not carried out;

a communication control means, operatively connected to the synchronization means, said communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication; and an output control means, operatively connected to the memory means, communication control means and synchronization means, said output control means for taking data of said arbitrarily set bit length out of the serial data stored in the memory means when the first duration is indicated by the communication control means, to effect the serial data communication, and for inhibiting the transmitting of the serial data when the second duration is indicated by the communication control means.

26. A serial data communication system including a microcomputer provided in a transmitting side thereof, the microcomputer including a controller and a CPU connected via an internal bus to the controller, and a memory chip provided in a receiving side thereof and receiving a serial data and a clock fed from the controller as a chip enable signal and a write enable signal, respectively, wherein the controller comprises:

a memory means connected to the internal bus, for serially storing data of a predetermined bit length of the serial data communication;

a bit length setting means for arbitrarily setting a bit length of data to be transmitted from the memory means;

a synchronization means, operatively connected to the memory means and responsive to a first clock and a second clock, said synchronization means for for synchronizing the serial data with the first clock when the serial data communication is carried out, and for synchronizing the serial data with the second clock when the serial data communication is not carried out;

a communication control means, operatively connected to the synchronization means, said communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication; and an output control means, operatively connected to the memory means, communication control means and said synchronization means, said output control means for taking data of said arbitrarily set bit length out of the serial data stored in the memory means when the first duration is indicated in said communication control means, to effect the serial data communication, and for inhibiting the transmitting of the serial data when the second duration is indicated in said communication control means, and the memory chip carries out a write/read operation of data in parallel form by means of the serial data and the clock fed from the contoller.

27. A serial data communication system including a microcomputer provided in a transmitting side thereof, the microcomputer including a controller and a CPU connected via an internal bus to the controller, and a system under control provided in a receiving side thereof, wherein the controller comprises:

a memory means connected to the internal bus, for serially storing data of a predetermined bit length of the serial data communication;

a bit length setting means for arbitrarily setting a bit length of data to be transmitted from the memory means;

a synchronization means, operatively connected to the memory means and responsive to a first clock and a second clock, said synchronization means for synchronizing the serial data with the first clock when the serial data communication is carried out, and for synchronizing the serial data with the second clock when the serial data communication is not carried out;

a communication control means, operatively connected to the synchronization means, said communication control means a) for counting the first clock, b) when a counted value of the first clock is within a value defined by said arbitrarily set bit length, for indicating a first duration in which the controller is permitted to effect the serial data communication, and c) when the counted value is out of the value defined by the arbitrarily set bit length, for indicating a second duration in which the controller is inhibited to effect the serial data communication; and an output control means, operatively connected to the memory means, communication control means and synchronization means, said output control means for taking data of said arbitrarily set bit length out of the serial data stored in the memory means when the first duration is indicated by said communication control means, to effect the serial data communication, and for inhibiting the transmitting of the serial data when the second duration is indicated by said communication control means, and the system under control comprises a plurality of memory chips, a circuit for detecting an edge of a clock fed from the controller, and a register means for temporarily latching a serial data fed from the controller and shifting the data in response to an output of the circuit, therein carrying out a write operation of data in serial form by means of the serial data fed from the controller.

* * * * *